United States Patent
Morimura et al.

(10) Patent No.: US 7,062,075 B2
(45) Date of Patent: Jun. 13, 2006

(54) SURFACE SHAPE RECOGNITION SENSOR DEVICE

(75) Inventors: Hiroki Morimura, Kanagawa (JP); Toshishige Shimamura, Kanagawa (JP); Satoshi Shigematsu, Kanagawa (JP); Katsuyuki Machida, Kanagawa (JP); Hakaru Kyuragi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 685 days.

(21) Appl. No.: 10/140,742

(22) Filed: May 7, 2002

(65) Prior Publication Data

US 2002/0181748 A1    Dec. 5, 2002

(30) Foreign Application Priority Data

May 14, 2001 (JP) ............................. 2001-142963
Nov. 7, 2001 (JP) ............................. 2001-341611

(51) Int. Cl.
*G06K 9/00* (2006.01)
(52) U.S. Cl. .................... 382/124; 702/104; 702/130
(58) Field of Classification Search ............. 382/124, 382/128, 181, 232; 337/12, 14, 123, 140, 337/139; 73/609, 756, 617, 596; 324/71.1, 324/537, 500; 702/104, 130
See application file for complete search history.

(56) References Cited

U.S. PATENT DOCUMENTS

| | | | |
|---|---|---|---|
| 4,532,508 A * | 7/1985 | Ruell | 340/5.83 |
| 5,940,525 A * | 8/1999 | Itsumi | 382/124 |
| 6,049,620 A | 4/2000 | Dickinson et al. | |
| 6,633,656 B1 * | 10/2003 | Picard | 382/124 |
| 6,672,174 B1 * | 1/2004 | Deconde et al. | 73/862.046 |
| 6,759,264 B1 * | 7/2004 | Chou et al. | 438/48 |
| 6,766,040 B1 * | 7/2004 | Catalano et al. | 382/115 |
| 6,871,242 B1 * | 3/2005 | Ho-Lung et al. | 710/16 |
| 6,901,154 B1 * | 5/2005 | Dunn | 382/115 |

FOREIGN PATENT DOCUMENTS

| | | |
|---|---|---|
| EP | 1162564 | 12/2001 |
| JP | 57-67667 | 4/1984 |
| JP | 2000-28311 A | 1/2000 |

OTHER PUBLICATIONS

Marco Tartagni and Robert Guerrieri, A 390 dpi Live Fingerprint Imager Based on Feedback Capacitive Sensing Scheme, 1997 IEEE International Solid-State Circuits Conference, pp. 200-201 (1997).

P. Rey et al., "A High Density Capacitive Pressure Sensor Array for Fingerprint Sensor Application", IEEE International Conference on Solid-State Sensors and Actuators, pp. 1453-1456 (1997).

D. Inglis et al., "A Robust, 1.8V 250uW Direct-Contact 500dpi Fingerprint Sensor", ISSCC Digest of Technical Papers, Feb. 1998 pp. 284-285.

* cited by examiner

*Primary Examiner*—Sheela Chawan
(74) *Attorney, Agent, or Firm*—Blakely Sokoloff Taylor & Zafman

(57) ABSTRACT

A calibration mode signal line to which sensor cells are commonly connected is arranged. In a calibration mode, a calibration mode signal is supplied to the sensor cells through the calibration mode signal line to designate calibration. In each sensor cell, when the calibration mode signal is being supplied from the calibration mode signal line, and the sensor cell is selected by the decoder, calibration operation of adjusting the detection sensitivity of a sensor circuit is executed using a calibration circuit.

12 Claims, 14 Drawing Sheets

SURFACE SHAPE RECOGNITION SENSOR DEVICE

BACKGROUND OF THE INVENTION

The present invention relates to a surface shape recognition sensor device and, more particularly, to a surface shape recognition sensor device which senses a fine three-dimensional pattern such as a human fingerprint or animal noseprint.

As application examples of a surface shape recognition sensor device for detecting the surface shape of an object to be detected, a number of fingerprint sensors for detecting a fingerprint pattern have been proposed. One is described in, e.g., "ISSCC DIGEST OF TECHNICAL PAPERS" February 1998, pp. 284–285.

In this sensor, a sensor electrode is formed in each of cells (to be referred to as sensor cells hereinafter) that are two-dimensionally arrayed on an LSI chip. An electrostatic capacitance formed between the sensor electrode and the skin surface of a finger that comes into contact with the sensor electrode via an insulating film is detected, thereby sensing the three-dimensional pattern of the skin surface. Since the value of formed capacitance changes depending on the three-dimensional pattern of the skin surface, the three-dimensional pattern of the skin surface can be sensed by detecting the capacitance difference.

A surface shape recognition sensor device having a means for individually adjusting the detection sensitivities of a plurality of sensor circuits can be supposed.

FIG. 10 shows a use state of such a surface shape recognition sensor device having a detection sensitivity adjusting function. This surface shape recognition sensor device is constructed by a number of sensor cells adjacent to each other. Typically, the surface shape recognition sensor device is formed from a number of sensor cells 11 two-dimensionally arranged (in an array or grid shape).

An object to be detected, such as a finger 13, is brought into contact with a sensor surface 12 of a surface shape recognition sensor device 10. A surface (three-dimensional shape of a fingerprint) 14 to be detected is individually detected by each sensor cell 11, and two-dimensional data representing the surface shape of the object to be detected is output.

FIG. 11 shows the entire arrangement of the conventional surface shape recognition sensor device.

The sensor cells 11 are arranged in a two-dimensional matrix with p rows×q columns. The sensor cells 11 are connected to word lines WL1 to WLp for selectively controlling the sensor cells 11 and data lines DL1 to DLq for propagating the outputs from the sensor cells 11 so as to form a grid shape.

A decoder 20 and A/D conversion circuit 30 are arranged in the periphery of the sensor cells 11. The decoder 20 controls the word lines in accordance with a received address signal ADR. The A/D conversion circuit 30 converts analog signals received from the data lines into a digital signal and outputs it.

In this way, in the surface shape recognition sensor device 10, a plurality of sensor cells 11 are sequentially selected by the decoder 20, and the analog outputs from the sensor cells 11 are converted into digital outputs by the A/D conversion circuit 30. The sensor cells 11 share the A/D conversion circuit 30. With this arrangement, any increase in circuit scale is suppressed, and the analog outputs from a number of sensor cells 11 are efficiently converted into digital outputs.

The surface shape recognition sensor device 10 has a function of adjusting (to be referred to as calibration hereinafter) the sensitivity of each sensor cell to uniform a variation in characteristic, i.e., detection sensitivity between the sensor cells 11 due to the manufacturing process.

In the conventional surface shape recognition sensor device 10, calibration mode signal lines CL1 to CLp are connected to the plurality of sensor cells 11, like the word lines WL1 to WLp.

When a calibration mode signal line is activated, a calibration control circuit 40 sequentially selects a plurality of sensor cells and sequentially calibrates the selected sensor cells.

FIG. 12 shows a conventional sensor cell. The sensor cell 11 is formed from a detection element 1, a sensor circuit 2, a calibration circuit 3, and a selection circuit 4.

The detection element 1 converts a surface shape into an electric amount. The sensor circuit 2 measures the electric amount of the detection element, which changes depending on the surface shape, causes an internal voltage-time conversion circuit (to be referred to as a VT conversion circuit hereinafter) 21 to convert the electric amount into a time signal having a pulse width corresponding to the electric amount, and outputs the time signal as an output signal 2A.

The calibration circuit 3 individually executes adjustment (sensitivity adjustment) of the detection sensitivity of the sensor circuit 2 in each sensor cell 11. The selection circuit 4 sets the sensor cell 11 in an operative state on the basis of the active state of the word line WL or the calibration mode signal from the calibration mode signal line CL.

To calibrate the detection sensitivity of the sensor circuit 2 in each sensor cell 11, a reference sample without any three-dimensional pattern is detected by the sensor, or detection is performed without placing anything on the sensor surface, thereby causing the respective sensor cells 11 to detect the same measurement value.

The output signal 2A from each sensor cell 11 is input to the calibration circuit 3 of that sensor cell. The calibration circuit 3 is formed from a load circuit 31, a counter circuit (n-bit) 32, and a time signal comparison circuit 33.

The time signal comparison circuit 33 compares the output signal 2A with a reference pulse signal 3A having a pulse width corresponding to a desired detection sensitivity. A comparison result having a pulse width corresponding to the difference between them is input to the counter circuit (n-bit) 32 as a counter input signal 3B.

The counter circuit 32 executes new counter operation on the basis of the counter input signal 3B. The count data of the counter circuit 32 is sequentially updated. Connection of the sensor circuit 2 to n load elements $Z_1$ to $Z_n$ arranged in the load circuit 31 is controlled on the basis of the count data so that the detection sensitivity of the sensor circuit 2 is adjusted.

As the load elements $Z_1$ to $Z_n$ in the load circuit 31, load elements that can be controlled to active and inactive states may be used. FIGS. 13A and 13B show implementation examples of load elements that can be controlled to active and inactive states. FIG. 13A shows capacitive load elements. FIG. 13B shows resistive load elements. When an electrostatic capacitance formed between the finger surface 14 and a sensor electrode 1B is used as the electric amount, one of the load elements shown in FIG. 13A is used. When a contact resistance formed between the finger surface 14 and the sensor electrode 1B is used as the electric amount, one of the load elements shown in FIG. 13B is used.

This operation is repeated a number of times corresponding to the number of adjustment stages, e.g., $2^n-1$ times except a state wherein all load elements Z are unselected, thereby adjusting the detection sensitivity of each sensor circuit 2 and uniforming the performance of the sensor cells.

As shown in FIG. 12, the detection element 1 is implemented by the sensor electrode 1B formed on an insulating layer 16 and covered with a passivation film 15. As the electric amount, an electrostatic capacitance $C_f$ formed between the finger surface 14 and the sensor electrode 1B is used.

The sensor circuit 2 is formed from a Pch MOSFET $Q_1$, an Nch MOSFET $Q_2$, an constant current source I, and the VT conversion circuit 21. Reference symbol $C_{p0}$ denotes a parasitic capacitance.

FIG. 14 shows the detection operation of a sensor cell.

Before time T1, a sensor circuit control signal $\overline{PRE}$ is controlled to a power supply voltage $V_{DD}$ to turn off the Pch MOSFET $Q_1$. A sensor circuit control signal RE is controlled to 0 V to turn off the Nch MOSFET $Q_2$. A node $N_1$ is set at 0 V.

At the time T1, the signal $\overline{PRE}$ is controlled to 0 V to turn on the Pch MOSFET $Q_1$. The potential of the node $N_1$ rises up to $V_{DD}$. At time T2, the signals $\overline{PRE}$ and RE are controlled to $V_{DD}$ to turn off the Pch MOSFET $Q_1$ and turn on the Nch MOSFET $Q_2$. With this operation, charges accumulated in the electrostatic capacitance $C_f$ are removed.

Hence, the potential of the node $N_1$ gradually drops at a rate depending on the electrostatic capacitance $C_f$. At time T3 after the elapse of a predetermined time $\Delta t$ from the time T2, the signal RE is controlled to 0 V to turn off the Nch MOSFET $Q_2$. At the node $N_1$, a potential $V_{DD}-\Delta V$ corresponding to the electrostatic capacitance $C_f$ is maintained. This potential is output to the VT conversion circuit 21.

The VT conversion circuit 21 has a constant current source $I_{VT}$, a capacitance $C_L$, and a threshold value circuit 22.

In the VT conversion circuit 21, the constant current source $I_{VT}$ operates in accordance with the potential of the node $N_1$ to charge the capacitance $C_L$. When the potential of the capacitance $C_L$ exceeds a predetermined threshold value $V_{TH}$, the threshold value circuit 22 inverts its output, i.e., the output signal 2A.

The output signal 2A is inverted after the elapse of a time corresponding to the potential of the node $N_1$ from the start of charge accumulation in the empty capacitance $C_L$. In sensing operation of detecting the surface shape of an object to be detected, this time length is measured, thereby detecting the three-dimensional pattern of the skin surface.

In calibration operation of adjusting the detection sensitivity of the sensor circuit 2, the time signal comparison circuit 33 operates on the basis of a calibration signal CAL from the calibration control circuit 40, and calibration by the calibration circuit 3 is executed. At this time, count data in the counter circuit 32 is set to the initial set value in advance to set all load elements in an inactive state. The output signal 2A from the VT conversion circuit 21 is set to the initial set value at the start of individual detection operation. The reference pulse signal 3A having a pulse width corresponding to a desired detection sensitivity is supplied to the sensor cell 11. In synchronism with this, the sensor cells 11 sequentially execute detection operation.

With this operation, the output signal 2A is obtained from the sensor circuit 2. As shown in FIG. 15, the time signal comparison circuit 33 compares the output signal 2A with the reference pulse signal 3A. For example, the output signal 2A and reference pulse signal 3A are ANDed to generate the counter input signal 3B.

When the electrostatic capacitance $C_f$ is constant, a delay time ts from the leading edge of the reference pulse signal 3A to the leading edge of the output signal 2A changes in accordance with the load in the load circuit 31.

When the output signal 2A has changed before the time determined by tr (ts<tr) (times T11 and T12), the counter input signal 3B is input to the counter circuit 32 for every detection operation. Hence, the counter circuit 32 increments the count data, and the load of the load circuit 31 sequentially increases.

When the output signal 2A has changed after the time determined by tr (ts≧tr) (time T13), the detection sensitivity of the sensor circuit 2 equals the desired sensitivity. The counter input signal 3B is not output anymore, and the selection state of the load elements at that time is held by the counter circuit 32.

As the load value of each load element, e.g., $Z_k=Z\cdot 2^{k-1}$ (k is a natural number) is set. Every time the count data is incremented, the value of the load circuit 31 is increased by Z. The detection sensitivity can be adjusted in Z increments.

Such calibration operation is individually executed for the respective sensor cells 11 to adjust them to an appropriate detection sensitivity. Even when the characteristic, i.e., detection sensitivity of the sensor circuit 2 changes between the sensor cells due to the process variation, the sensor cells can have uniform detection performance.

However, in such a conventional surface shape recognition sensor device, in adjusting the characteristics of the sensor circuits in the sensor cells, a desired sensor cell is selected by the calibration control circuit. This undesirably increases the circuit scale of the surface shape recognition sensor device. Especially, since the calibration control system is added to a control system for controlling normal surface shape detection operation, the circuit arrangement and control become complex. As a result, the chip area increases, the manufacturing yield degrades, and the design time is prolonged. This increases the manufacturing cost as a whole.

The present invention has been made to solve this problem, and has as its object to provide a surface shape recognition sensor device capable of calibrating the detection sensitivity of each sensor cell with a smaller circuit arrangement.

SUMMARY OF THE INVENTION

It is therefore the main object of the present invention to provide a surface shape recognition sensor device capable of calibrating the detection sensitivity of each sensor cell with a smaller circuit arrangement.

In order to achieve the above object, the present inventor found the following fact. That is, the surface shape recognition sensor device used in the present invention performs, as the operations of the surface shape recognition sensor device, detection operation of recognizing a surface shape and calibration operation of adjusting a sensor device. In the surface shape detection operation, no calibration operation is executed. In the calibration operation, no surface shape detection operation is executed. That is, the calibration operation is executed between the surface shape detection operations or at an appropriate time. The two operations are not simultaneously executed.

Hence, according to an aspect of the present invention, there is provided a surface shape recognition sensor device comprising a number of sensor cells which are two-dimensionally arranged, a decoder which selects a sensor cell, an output circuit which sends a sensor output from the selected sensor cell, a control circuit which sends an address signal to the decoder to select the sensor cell, and a calibration mode signal line which is commonly connected to the sensor cells and simultaneously supplies a calibration mode signal from the control circuit to the sensor cells to designate calibration, wherein each of the sensor cells comprises a detection element which detects an electric amount that changes in accordance with a surface shape of an object to be detected, a sensor circuit which performs sensing operation of measuring the electric amount detected by the detection element, converting the electric amount into a corresponding output signal, and outputting the output signal, and a calibration circuit which adjusts a detection sensitivity of the sensor circuit on the basis of the sensor output obtained by the sensing operation of the sensor circuit, and when the calibration mode signal is supplied from the control circuit to the sensor cells through the calibration mode signal line, on the basis of a selection signal from the decoder, calibration operation of adjusting the detection sensitivity of a corresponding sensor circuit is executed using the calibration circuit of the sensor cell.

DESCRIPTION OF THE PREFERRED EMBODIMENTS

The embodiments of the present invention will be described next with reference to the accompanying drawings.

Figure 1:
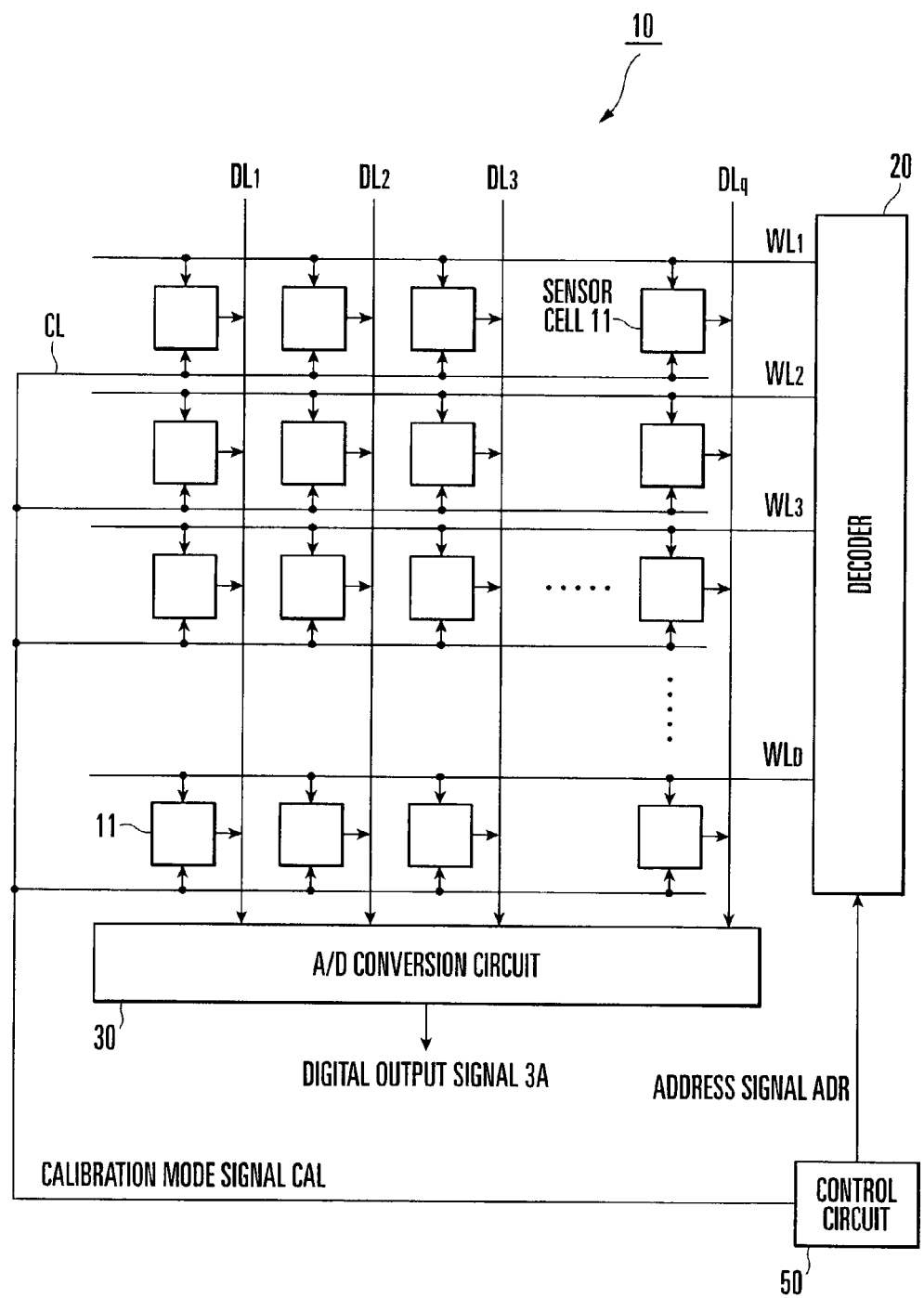
FIG. 1 is a block diagram showing the basic arrangement of a surface shape recognition sensor device according to the present invention.
Figure 11:
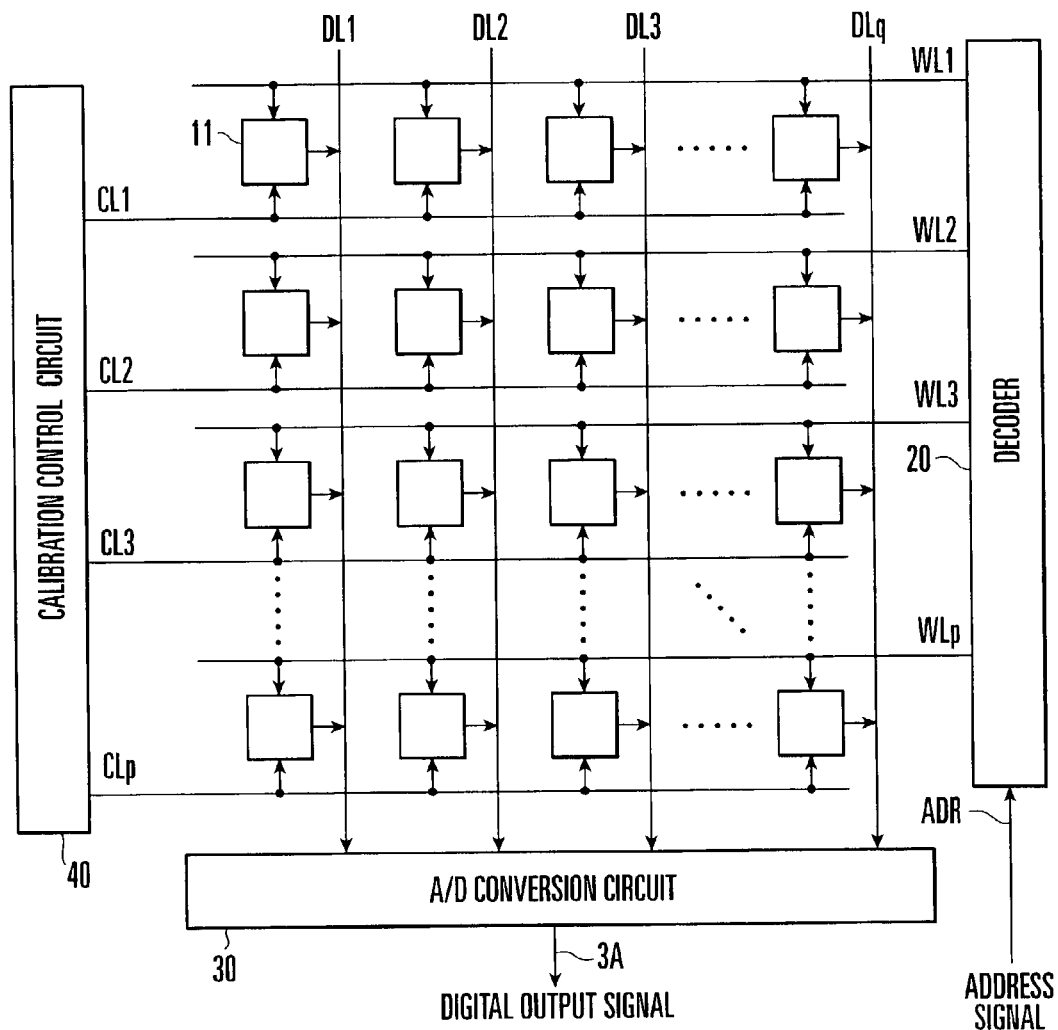
FIG. 11 is a view showing the overall arrangement of a conventional surface shape recognition sensor device.

FIG. 1 shows the basic arrangement of a surface shape recognition sensor device according to the present invention. The same reference numerals as in the above-described surface shape recognition sensor device shown in FIG. 11 denote the same or similar parts in FIG. 1.

In a surface shape recognition sensor device 10 shown in FIG. 1, sensor cells 11 are arranged in a two-dimensional matrix with p rows×q columns. The sensor cells 11 are connected to word lines WL1 to WLp for selectively controlling the sensor cells and data lines DL1 to DLq for propagating the outputs from the sensor cells 11 so as to form a grid shape.

A decoder 20 and A/D conversion circuit 30 are arranged in the periphery of the sensor cells 11. The decoder 20 controls the word lines WL1 to WLp in accordance with an address signal ADR supplied from a control circuit 50. The A/D conversion circuit 30 converts analog signals received from the data lines DL1 to DLq into a digital output signal 3A and outputs it. The sensor cells 11 are commonly connected to a calibration mode signal line CL. In the calibration mode, the same calibration mode signal CAL is simultaneously supplied to the sensor cells 11 through the calibration mode signal line CL. The calibration mode signal CAL is sent from the control circuit 50.

In the present invention, a normal surface shape detection operation mode or calibration operation mode is designated to the sensor cells 11 by the calibration mode signal CAL. In addition, the sensor cells 11 that should execute calibration can be selected by the decoder 20 used in the normal surface shape detection operation mode.

The address signal ADR (ADB or ADW to be described later) and calibration mode signal CAL are supplied from the control circuit 50. The signals may be supplied from a host device such as a CPU that externally controls the surface shape recognition sensor device or may be independently generated in the surface shape recognition sensor device and supplied.

Figure 2:
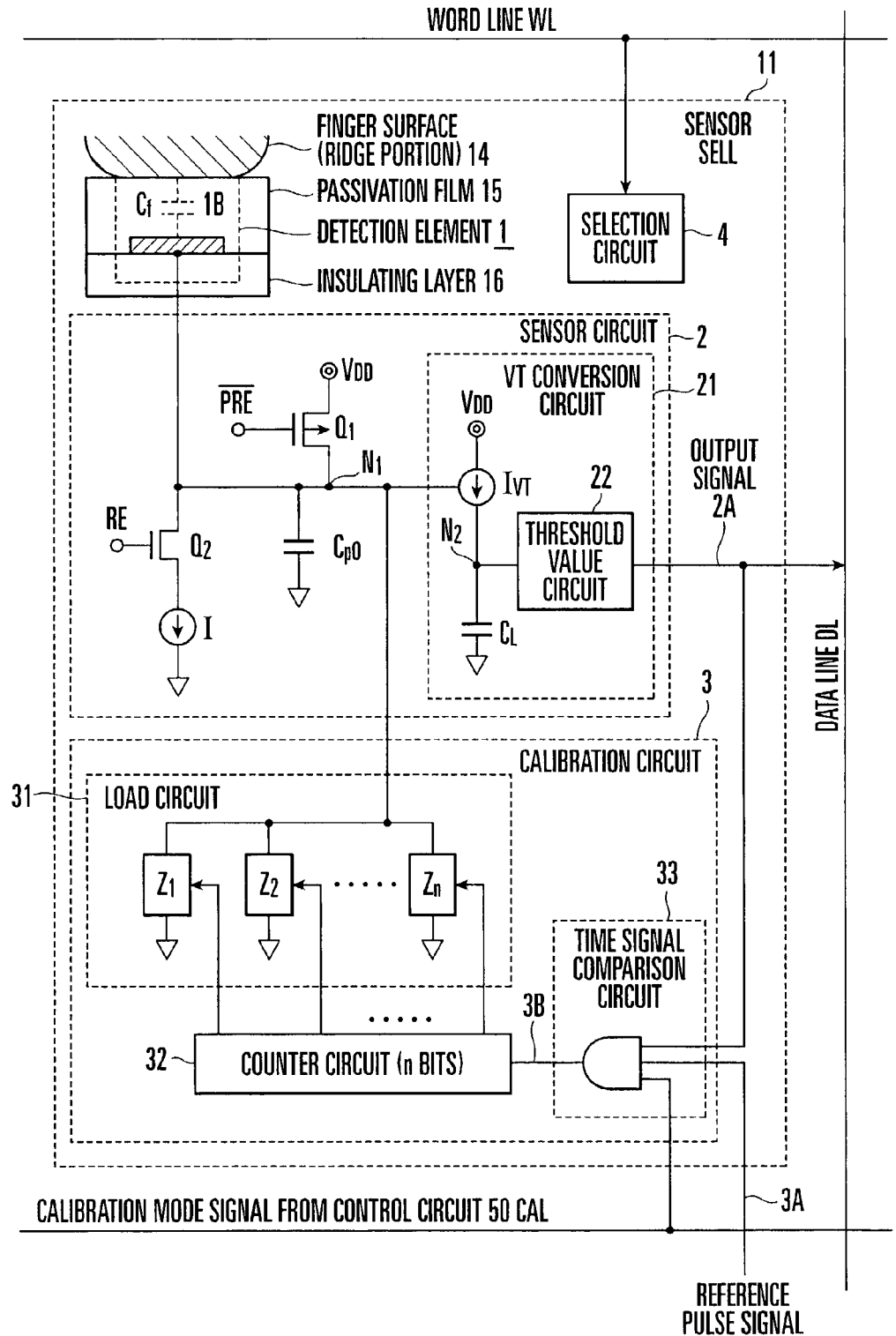
FIG. 2 is a block diagram showing a sensor cell shown in FIG. 1.
Figure 12:
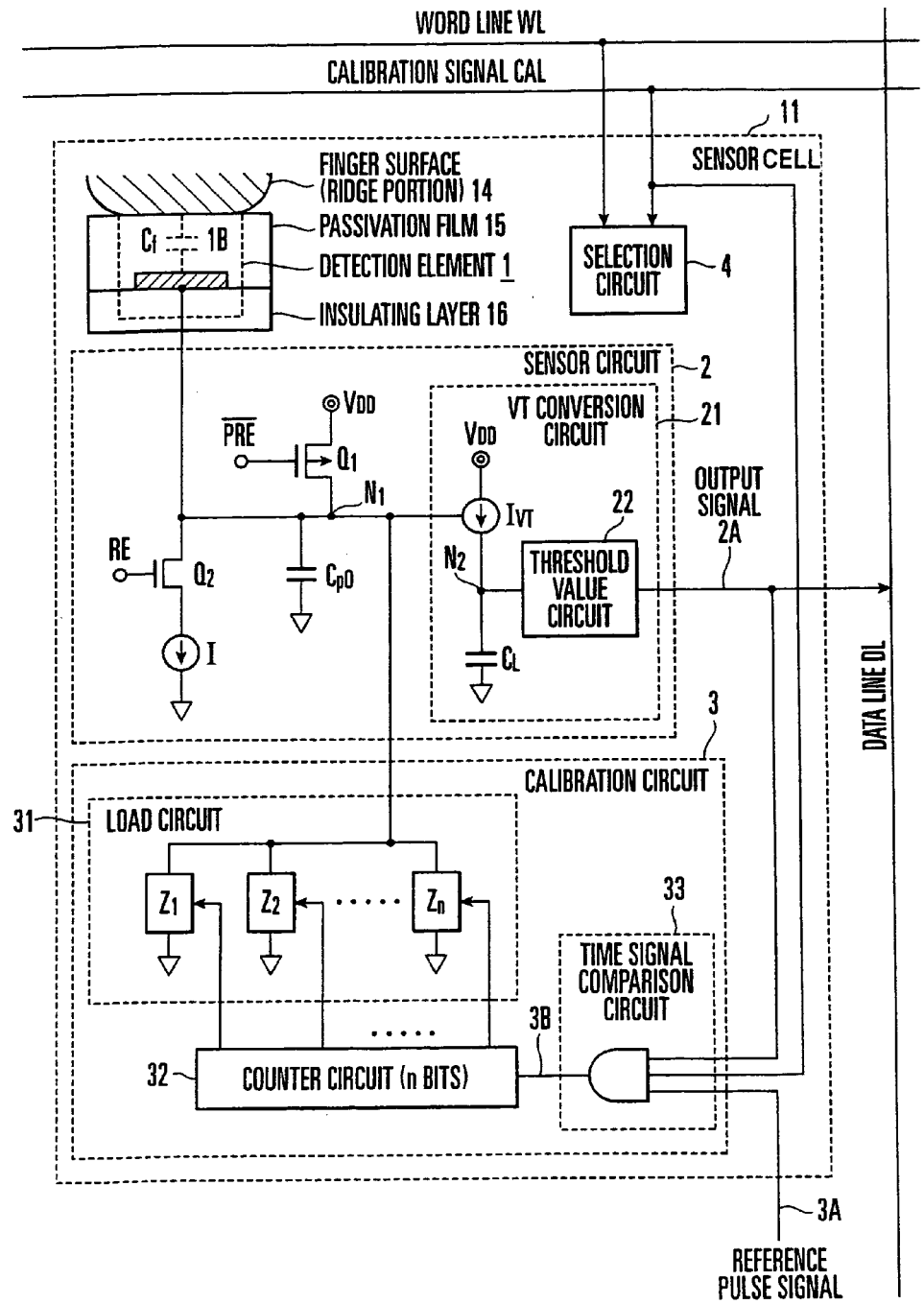
FIG. 12 is a block diagram showing a conventional sensor cell.
Figure 13A:
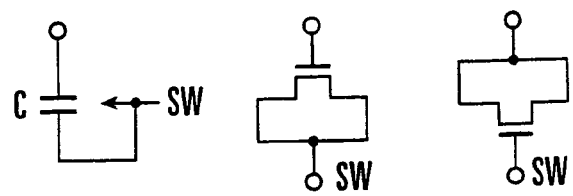
FIGS. 13A and 13B are views showing implementation examples of load elements that can be controlled to active and inactive states.
Figure 13B:
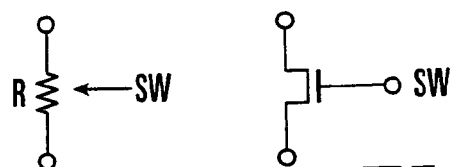

As shown in FIG. 2, each sensor cell 11 has almost the same arrangement as that of the above-described conventional sensor cell (FIG. 12). The same reference numerals as in FIG. 12 denote the same or similar parts in FIG. 2.

In the conventional sensor cell, the calibration mode signal CAL is input to the selection circuit 4 to control the operation of the sensor cell itself, resulting in redundant arrangement.

In the sensor cell 11 of the present invention, only the word line WL is input to a selection circuit 4. The calibration mode signal CAL is input only to a time signal comparison circuit 33.

Figure 3:
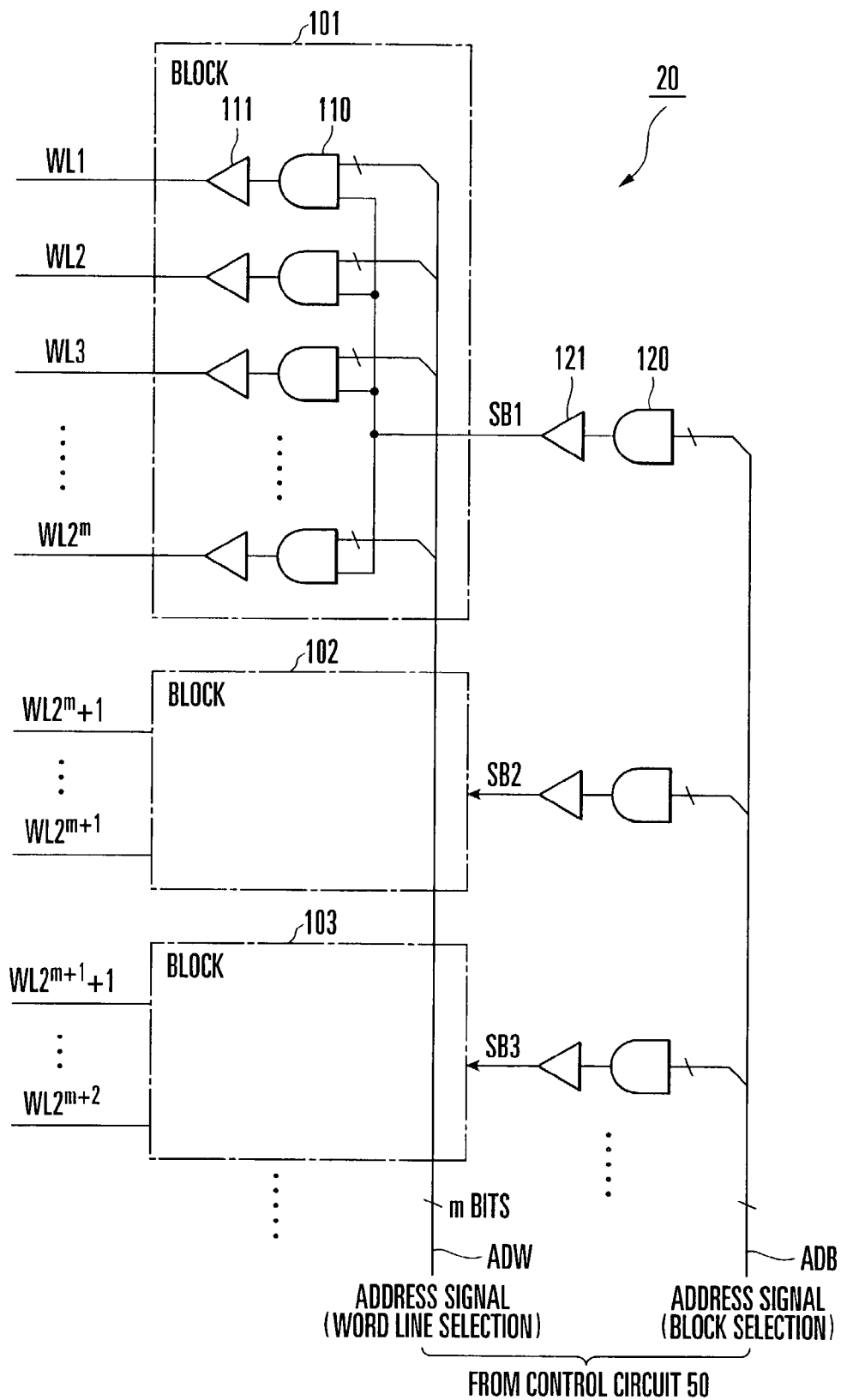
FIG. 3 is a block diagram showing the first embodiment of a decoder shown in FIG. 1.
Figure 4:
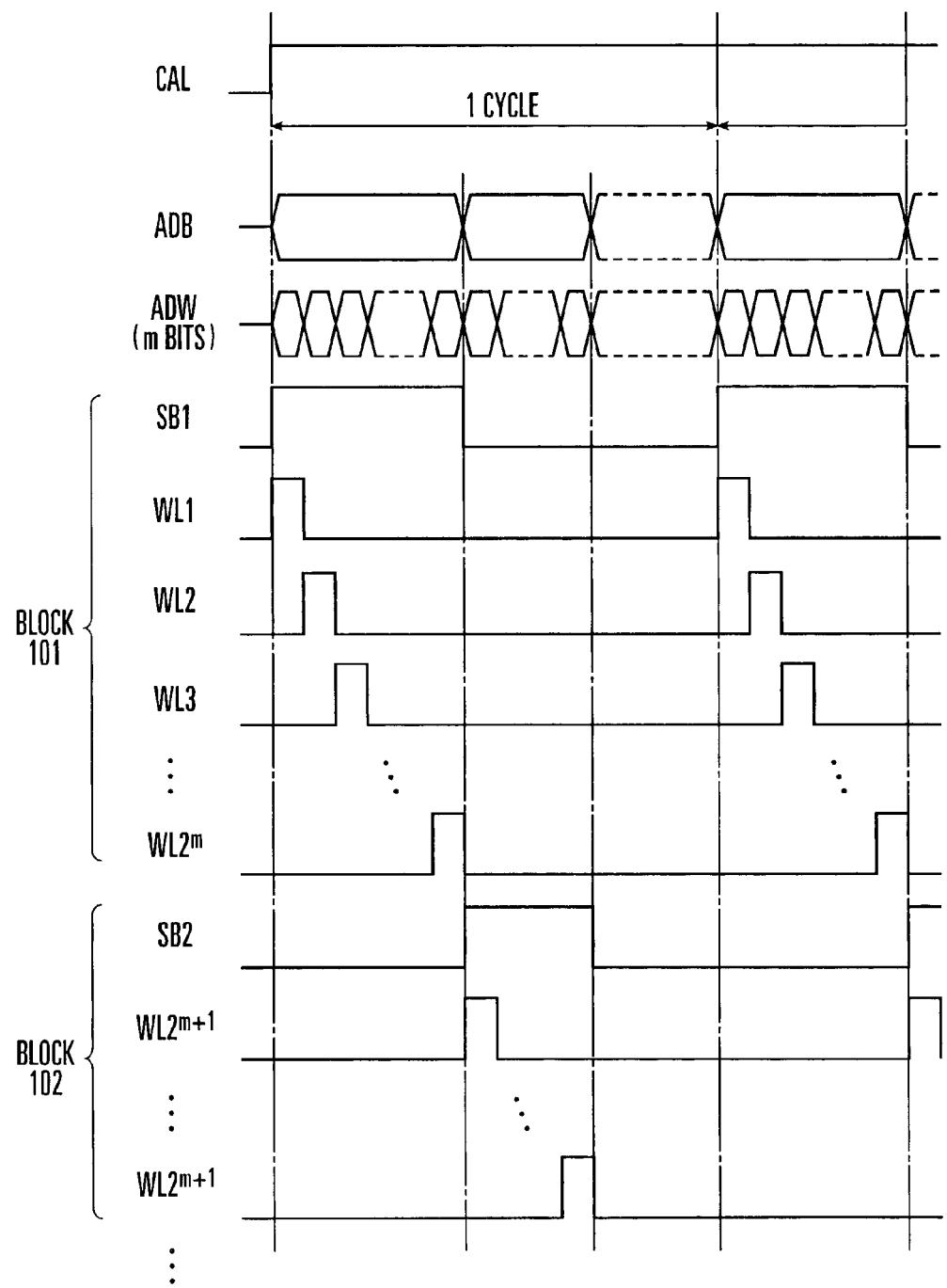
FIG. 4 is a timing chart showing the operation of the decoder shown in FIG. 3.

The first embodiment of the decoder 20 used in the surface shape recognition sensor device 10 according to the present invention will be described next with reference to FIGS. 3 and 4. FIG. 3 shows a detailed example of the decoder 20. FIG. 4 shows the operation of the decoder shown in FIG. 3.

Referring to FIG. 3, in the decoder 20, one block is formed every $2^m$ word lines WL (m is an integer: $m \geq 2$). Blocks 101, 102, 103, . . . are managed. In each block, a gate 110 which decodes an address value corresponding to a given word line WL, in the address signal ADW (m bits) for word line selection, and outputs a word line selection signal for activating the word line, and a buffer 111 which activates the word line WL in accordance with the word line selection signal from the gate 110 are arranged for each word line WL.

In addition, a gate 120 (block selection circuit) which decodes an address value corresponding to a given block, in the address signal bit ADB for block selection, and a buffer 121 which supplies the output from the gate 120 to the gate 110 of the block as a block selection signal SB (SB1, SB2, SB3, . . . ) are arranged in correspondence with each block.

When arbitrary address signals ADB and ADW are supplied to the decoder 20, the block selection signal SB is output to one of the blocks in accordance with the address value of the address signal ADB. In addition, one of the word lines WL is activated by the output from one of the gates 110 that have received the block signal, which corresponds to the address value of the address signal ADW.

More specifically, as the address signals ADB and ADW, complementary signals (for m bits, i.e., 2m signals) that indicate positive and negative logic levels for each address bit are used. Hence, address bits of positive or negative logic, which change to high level in correspondence with the addresses of the word lines WL, are selectively input to the gates 110. The AND of the address bits is output as a word line selection signal. This also applies to the gates 120. Address bits which change to high level in correspondence with the addresses of the blocks are selectively input to the gates 120. The AND of the address bits is output as a block selection signal.

In this arrangement, in the calibration mode, the calibration mode signal CAL (high level in FIG. 4) is supplied to all the sensor cells 11. As in the normal surface shape detection operation, the address signals ADB and ADW are sequentially changed to sequentially select the word lines. With this operation, as shown in FIG. 4, the block selection signal SB1 of the block 101 changes to high level to sequentially activate the word lines WL1 to WL$2^m$ one by one. Subsequently, the block selection signal SB2 of the e block 101 is validated to sequentially activate the word lines WL$2^m$+1 to WL$2^{m+1}$ one by one.

After that, all the word lines WL1 to WLp are selected once, and one cycle is ended. Then, the operation is returned to the word line WL1 again. The address signals ADB and ADW are sequentially changed to sequentially select the word lines.

In this way, the above cycle is repeated a number of times corresponding to the number of adjustment stages of calibration. The calibration operation is executed for each sensor cell 11 a number of times equal to the number of adjustment stages.

Figure 14:
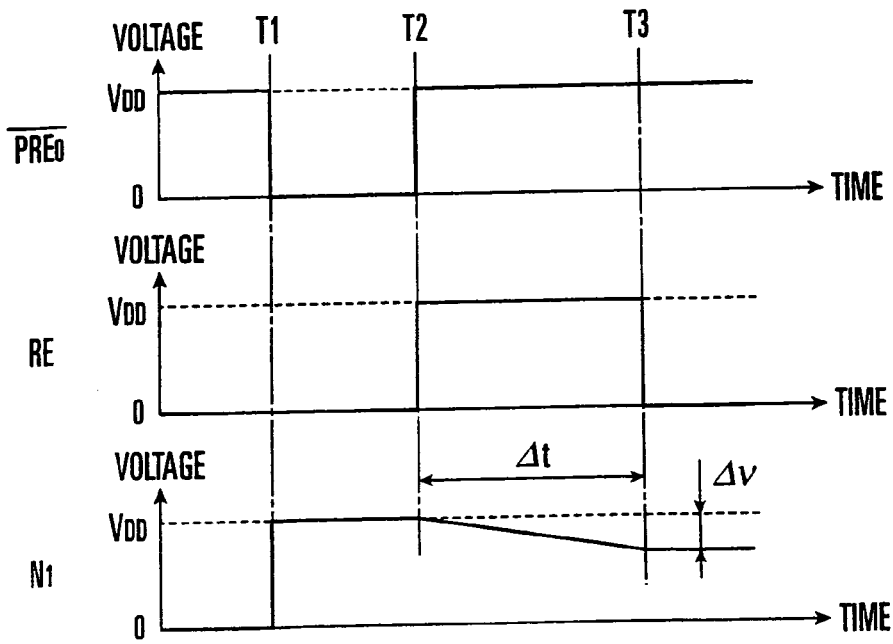
FIG. 14 is a timing chart showing the detection operation of the sensor cell.
Figure 15:
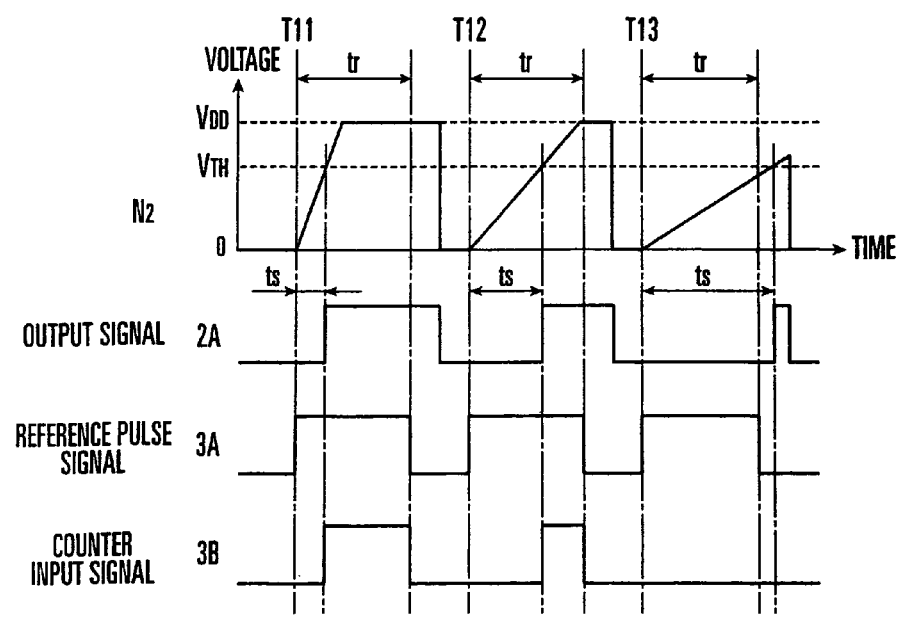
FIG. 15 is a timing chart showing calibration operation in the sensor cell.

The calibration operation in each sensor cell 11 is the same as that in FIGS. 14 and 15 described above, and a description thereof will be omitted here.

As described above, the calibration mode signal line CL to which the sensor cells 11 are commonly connected is arranged. A calibration mode signal (high level in FIG. 4) for designating calibration is supplied to the sensor cells through the calibration mode signal line. In each sensor cell 11, when the calibration mode signal CAL is being supplied from the calibration mode signal line CL, and the sensor cell is selected by the decoder 20, calibration operation of adjusting the detection sensitivity of the sensor circuit 2 is executed using the calibration circuit 3. Since calibration can be done using the decoder that is used for normal sensing without adding any calibration control circuit, any increase in circuit scale can be suppressed.

Figure 5:
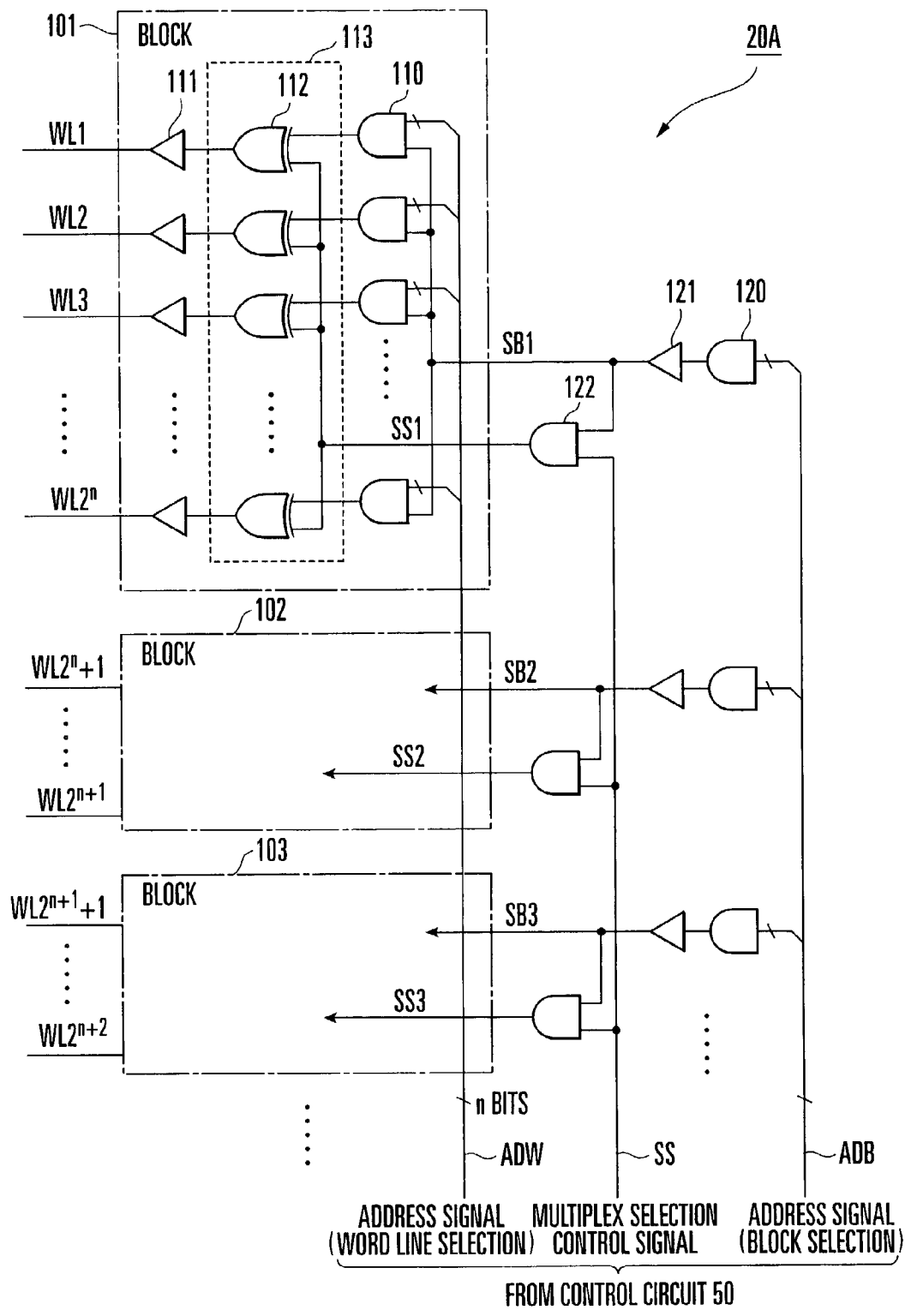
FIG. 5 is a block diagram showing the second embodiment of the decoder used in the surface shape recognition sensor device of the present invention.
Figure 6:
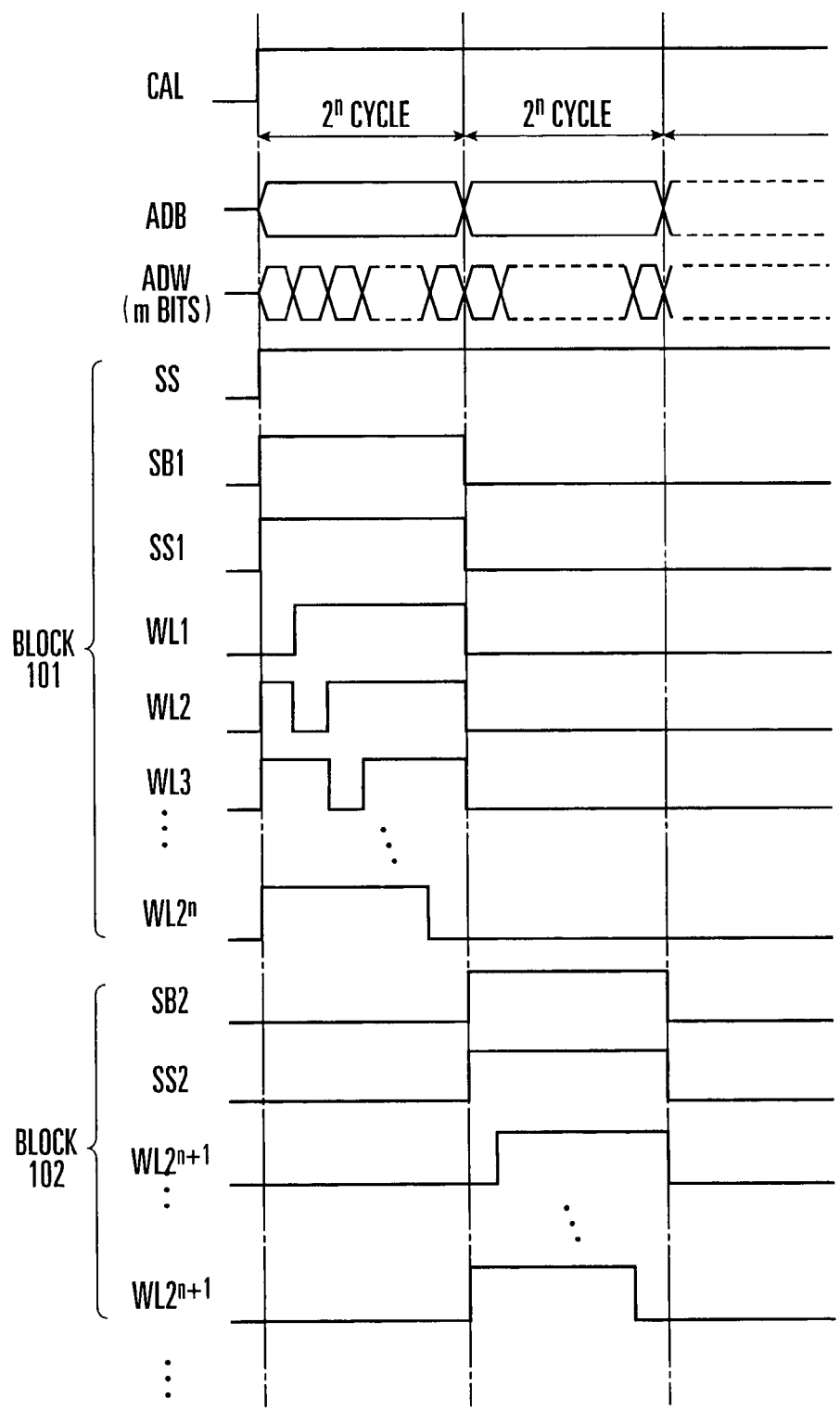
FIG. 6 is a timing chart showing the operation of the decoder shown in FIG. 5.

The second embodiment of a decoder 20A used in the surface shape recognition sensor device of the present invention will be described next with reference to FIGS. 5 and 6. FIG. 5 shows the second embodiment of the decoder 20A. FIG. 6 shows the operation of the decoder 20A.

In the first embodiment of the decoder, even in the calibration mode, the word lines WL are selected one by one as in the normal surface shape detection operation. In the decoder 20A of the second embodiment, a plurality of word lines are simultaneously selected for each block.

The decoder 20A of this embodiment is different from the decoder 20 (FIG. 3) of the first embodiment in that a gate 122 that outputs the AND between a block selection signal SB and a multiplex selection control signal SS as a block multiplex selection control signal SSx (SS1, SS2, SS3, . . . ) is arranged for each block, and a block multiplex selection control circuit 113 formed from gates 112 each arranged between a gate 110 and a buffer 111 of each word line WL is arranged in each block. Each gate 112 receives the output from the gate 110 of a corresponding word line WL and the block multiplex selection control signal SSx of the block. The exclusive-OR (EOR) of these inputs is output to the buffer 111. The multiplex selection control signal SS is sent from a control circuit 50 in the calibration mode.

In the second embodiment of the decoder, in the normal surface shape detection operation, the multiplex selection control signal SS is set at low level. For this reason, the block multiplex selection control signal SSx from the gate 122 of each block changes to low level, and each gate 112 in the block multiplex selection control circuit 113 operates as a buffer. With this operation, only one word line WL corresponding to address signals ADB and ADW is activated.

The multiplex selection control signal SS and address signals ADB and ADW are sent from the control circuit 50. The signals may be supplied from a host device such as a CPU that externally controls the surface shape recognition sensor device or may be independently generated in the surface shape recognition sensor device and supplied.

In the calibration mode, when the multiplex selection control signal SS sent from the control circuit 50 is set at high level, the block multiplex selection control signal SSx changes to high level only in a block selected by the address signal ADB.

Hence, in the calibration mode, a calibration mode signal CAL (high level in FIG. 6) is supplied to all the sensor cells 11. When the address signals ADB and ADW are sequentially changed to sequentially select the word lines WL, e.g., a block selection signal SB1 of a block 101 changes to high level to sequentially select word lines WL1 to WL$2^n$, as shown in FIG. 6. Note that n is the number of load elements Z in the calibration circuit 3.

At this time, the block multiplex selection control signal SS1 is input from the gate 122 to the gates 112 in the block 101. Each gate 112 operates as an inverter. For this reason, in the word lines WL1 to WL$2^n$ of the block 101, all word lines except one word line WL corresponding to the address value of the address signal ADW are activated.

That is, $2^n-1$ word lines are multiplexed and selected by one address value of the address signal ADW. The word lines WL in the block are activated $2^n-1$ times only by making one addressing cycle of the address values of the address signal ADW, i.e., in $2^n$ cycles.

In this way, the selection operation is executed for each block, thereby performing calibration operation for each sensor cell 11 a number of times corresponding to the number of adjustment stages.

With this arrangement, when the address signal is supplied as in the normal surface shape detection operation, calibration can be completed for all the sensor cells 11. Calibration can be executed at a speed $2^n-1$ times higher than that in the first embodiment. Hence, the time required for calibration can be considerably shortened.

In this embodiment, the block multiplex selection control circuit 113 simultaneously selects, from the word lines WL belonging to the block, all word lines except a word line corresponding to the address signal ADW on the basis of the AND between the block selection signal SB of the block and the multiplex selection control signal SS supplied in the calibration mode. However, the present invention is not limited to this. For example, when the multiplex selection control signal SS is supplied, the block multiplex selection control circuit 113 may activate all word lines WL of the block selected by the address signal ADB. The time required for calibration can be considerably shortened, as in the above-described case. At this time, when the word lines are divided such that each block has word lines equal in number to the number of adjustment stages, i.e., the number of times of calibration operation, efficient calibration is possible.

Figure 7:
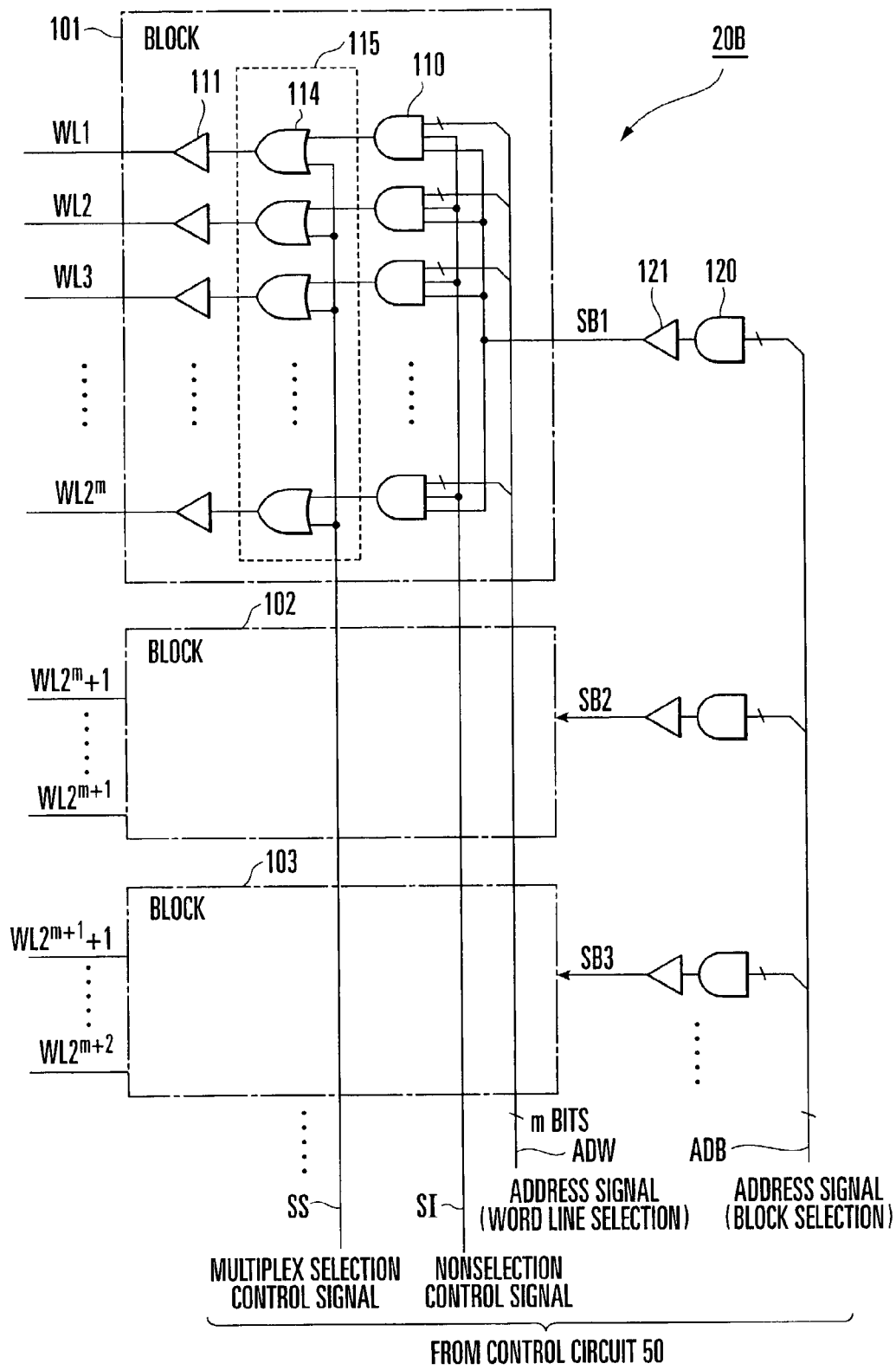
FIG. 7 is a block diagram showing the third embodiment of the decoder used in the surface shape recognition sensor device of the present invention.
Figure 8:
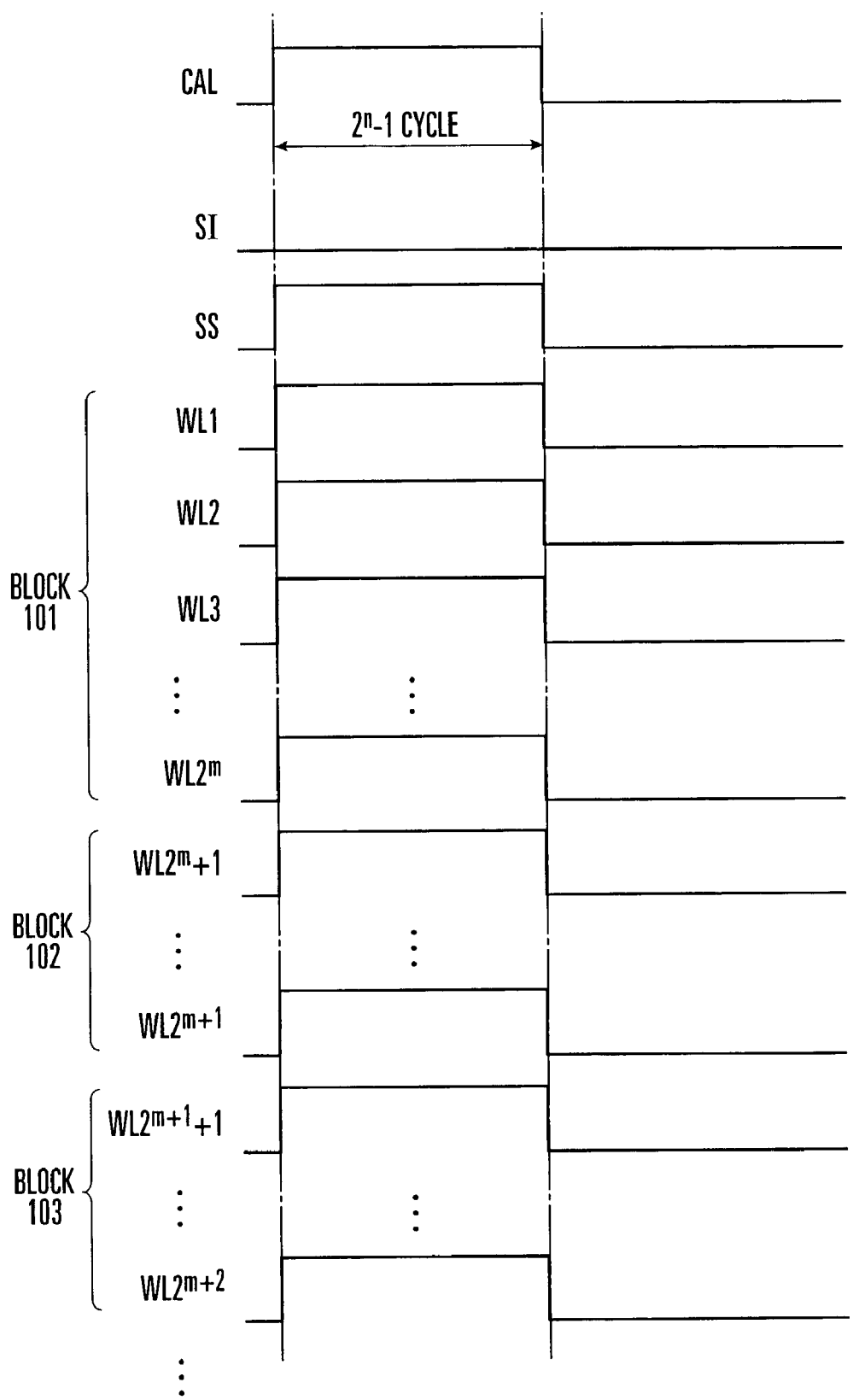
FIG. 8 is a timing chart showing the operation of the decoder shown in FIG. 7.

The third embodiment of a decoder 20B used in the surface shape recognition sensor device of the present invention will be described next with reference to FIGS. 7 and 8. FIG. 7 shows the third embodiment of the decoder 20B. FIG. 8 shows the operation of the decoder 20B shown in FIG. 7.

In the second embodiment, a plurality of word lines WL are multiplexed and selected for each block in the calibration mode. In the decoder 20B of the third embodiment, all word lines are simultaneously selected instead of selecting them for each block.

Unlike the decoder 20 (FIG. 3) of the first embodiment, each block of the decoder 20B of this embodiment has a batch multiplex selection circuit 115 formed from gates 114 each arranged between a gate 110 and a buffer 111 of each word line WL. Each gate 114 receives the output from the gate 110 of a corresponding word line WL and a multiplex selection control signal SS. The OR of these inputs is output to the buffer 111. A nonselection control signal SI (negative logic) output in the calibration operation (a calibration mode signal CAL shown in FIG. 8 is supplied to each sensor cell) is supplied to one input of each gate 110. The multiplex selection control signal SS and nonselection control signal SI are supplied from a control circuit 50.

In the decoder 20B shown in FIG. 7, in the normal surface shape detection operation, when the nonselection control signal SI from the control circuit 50 is set at high level, each gate 110 operates as an OR gate. When the multiplex selection control signal SS is set at low level, each gate 114 in each block operates as a buffer. With this operation, only one word line WL corresponding to address signals ADB and ADW is activated.

The nonselection control signal SI, other control signals, and the address signals from the control circuit 50 may be supplied from a control circuit in a host device such as a CPU that externally controls the surface shape recognition sensor device.

In the calibration mode, when the nonselection control signal SI supplied from the control circuit 50 is set at low level, the output from each gate 110 changes to low level. For this reason, the states of all word lines WL can be controlled in accordance with the multiplex selection control signal SS. That is, when the multiplex selection control signal SS is at high level, all word lines WL are activated. When the multiplex selection control signal SS is at low level, all word lines WL are inactivated.

Hence, in the calibration mode, the nonselection control signal SI is set at low level, and simultaneously, the calibration mode signal CAL is supplied to all sensor cells 11, as shown in, e.g., FIG. 8.

The multiplex selection control signal SS is set at high level during a period corresponding to the number of cycles $2^n-1$ equal to the number of adjustment stages of calibration, and sensing operation is executed in all the sensor cells 11. At this time, the address signals ADB and ADW can have arbitrary address values.

With this arrangement, calibration can be completed for all the sensor cells 11. Calibration can be executed at a speed p times (p is the number of word lines WL) higher than that in the first embodiment. Hence, the time required for calibration can be considerably shortened.

When the word lines WL are managed divisionally in a plurality of blocks by the decoder 20B, the calibration time can be further shortened, and control can be simplified as compared to the second embodiment because $(2^n-1)<<p$.

Figure 9:
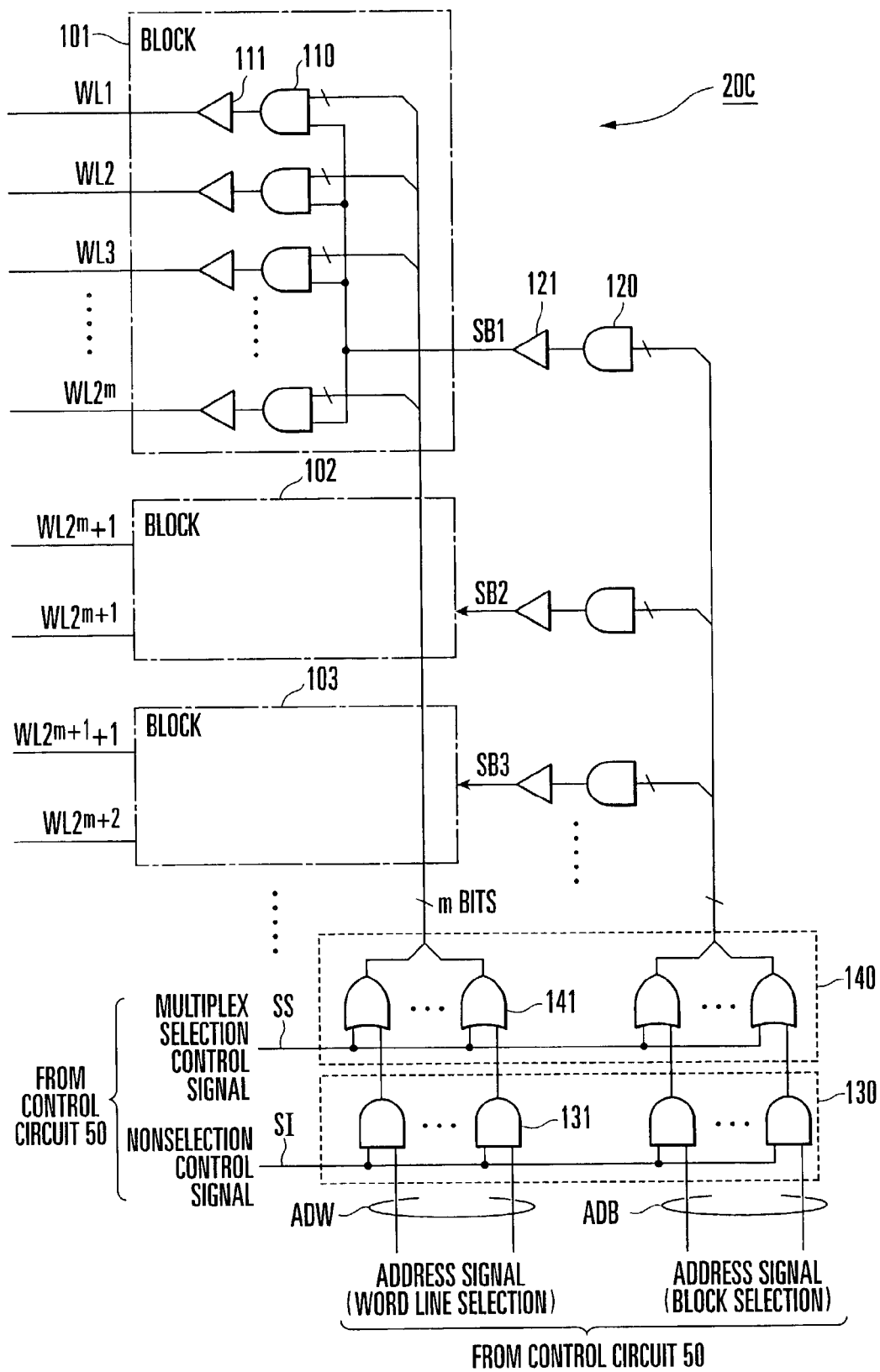
FIG. 9 is a block diagram showing the fourth embodiment of the decoder used in the surface shape recognition sensor device of the present invention.
Figure 10:
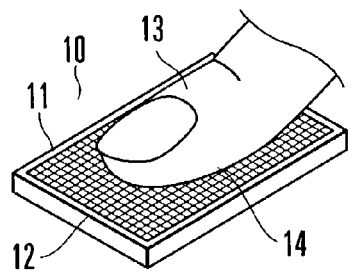
FIG. 10 is a view for explaining a general use state of a surface shape recognition sensor device.

The fourth embodiment of a decoder used in the surface shape recognition sensor device of the present invention will be described next with reference to FIG. 9. FIG. 9 shows the fourth embodiment of a decoder 20C.

In the third embodiment, the batch multiplex selection circuit 115 is arranged in each block, and all the word lines WL are multiplexed and selected by outputting the multiplex selection control signal SS in the calibration mode. In the decoder 20C of the fourth embodiment, all word lines are simultaneously selected using a batch selection address output circuit which outputs batch selection address values as address signals ADB and ADW to be supplied to each block, instead of arranging the batch multiplex selection circuit 115 in each block.

The decoder 20C of the fourth embodiment is different from the decoder 20 (FIG. 3) of the first embodiment in that an address gate circuit 130 and batch selection address output circuit 140 are arranged, as shown in FIG. 9. The address gate circuit 130 is formed from gates 131 arranged in correspondence with the respective address signal lines. The AND between an address value and a nonselection control signal SI (negative logic) is output from each gate 131. The batch selection address output circuit 140 is formed from gates 141 arranged in correspondence with the respective address signal lines. Each gate 141 outputs the OR between the output from a corresponding gate 131 and a multiplex selection control signal SS as an address signal ADB or ADW to each block.

In the decoder shown in FIG. 9, in the normal surface shape detection operation, when the nonselection control signal SI supplied from a control circuit 50 is set at high level, each gate 131 operates as a buffer. When the multiplex selection control signal SS supplied from the control circuit 50 is set at low level, each gate 141 also operates as a buffer.

With this operation, since the address signals ADB and ADW are directly supplied to each block, only one word line WL corresponding to the address values is activated.

In the calibration mode, when the nonselection control signal SI is set at low level, the output from each gate 131 changes to low level. For this reason, an address value corresponding to the level of the multiplex selection control signal SS is supplied to each block.

At this time, as the batch selection address value for selecting all the word lines WL, a value for changing all address lines to high level is set in advance. In this case, the batch selection address value is supplied from the gates 131 to gates 110 and 120 of each block only by settling the multiplex selection control signal SS at high level. Hence, all the word lines WL are activated, as in FIG. 8 described above.

As described above, complementary signals are used as the address signals ADB and ADW. Address bits of positive or negative logic, which change to high level in correspondence with the address to be decoded, are selectively input to the gates 110 and 120. Hence, when the batch selection address value that change all the address lines to high level in accordance with the multiplex selection control signal SS is output from the batch selection address output circuit 140, all word lines are activated.

When the multiplex selection control signal SS supplied from the control circuit 50 is set at low level, the outputs from the address gate circuit 130 are output as the address signals ADB and ADW. At this time, when the nonselection control signal SI supplied from the control circuit 50 is set at low level, all the address lines change to low level. Hence, no word line WL is selected.

As described above, the batch selection address output circuit 140 is arranged to output the batch selection address value as the address signals ADB and ADW to be supplied to each block in the calibration mode, thereby simultaneously selecting all word lines. With this arrangement, as in the third embodiment, calibration can be executed at a speed p times (p is the number of word lines WL) higher than that in the first embodiment. Hence, the time required for calibration can be considerably shortened. In addition, unlike the third embodiment, since the batch multiplex selection circuit 115 need not be arranged in each block, the circuit arrangement can be further reduced.

As described above, in the present invention, a calibration mode signal line to which sensor cells are commonly connected is arranged. A calibration mode signal for designating calibration is supplied to each sensor cell through the calibration mode signal line. In each sensor cell, when the calibration mode signal is being supplied from the calibration mode signal line, and the sensor cell is selected by a decoder, calibration operation of adjusting the detection sensitivity of a sensor circuit is executed using a calibration circuit. Since calibration can be done using the decoder that is used for normal sensing without adding any calibration control circuit as in the prior art, any increase in circuit scale can be suppressed. In addition, control operation can be performed in the same way as in the normal surface shape detection operation by changing the state of the calibration mode signal. Hence, control can be simplified.

A logic circuit (exclusive OR/exclusive NOR circuit) used in the embodiments of the present invention will be described next with reference to the accompanying drawings.

Figure 16:
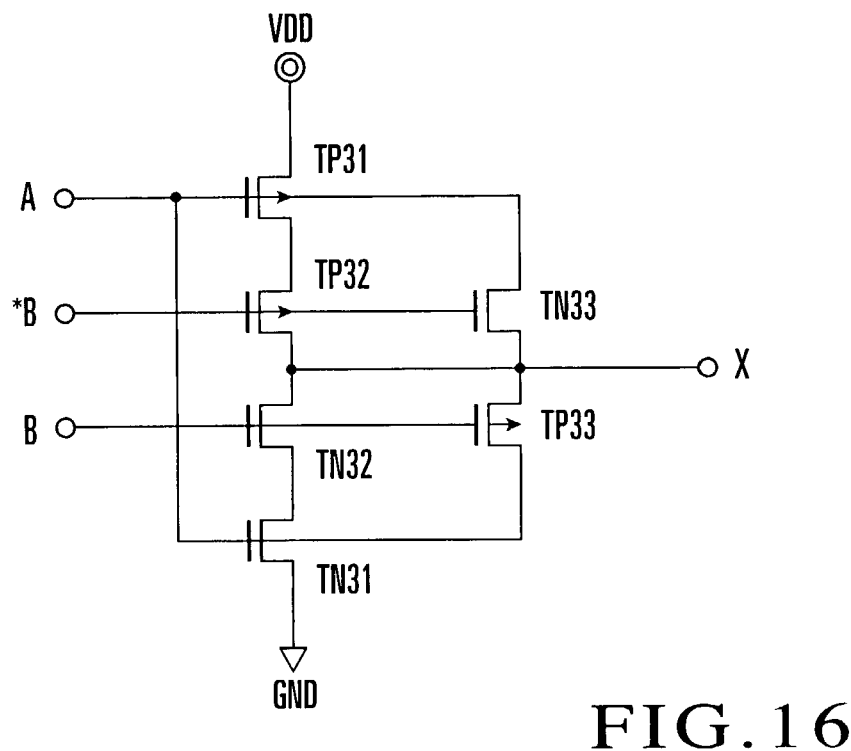
FIG. 16 is a circuit diagram showing a detailed example of a logic circuit used in the present invention.
Figure 17:
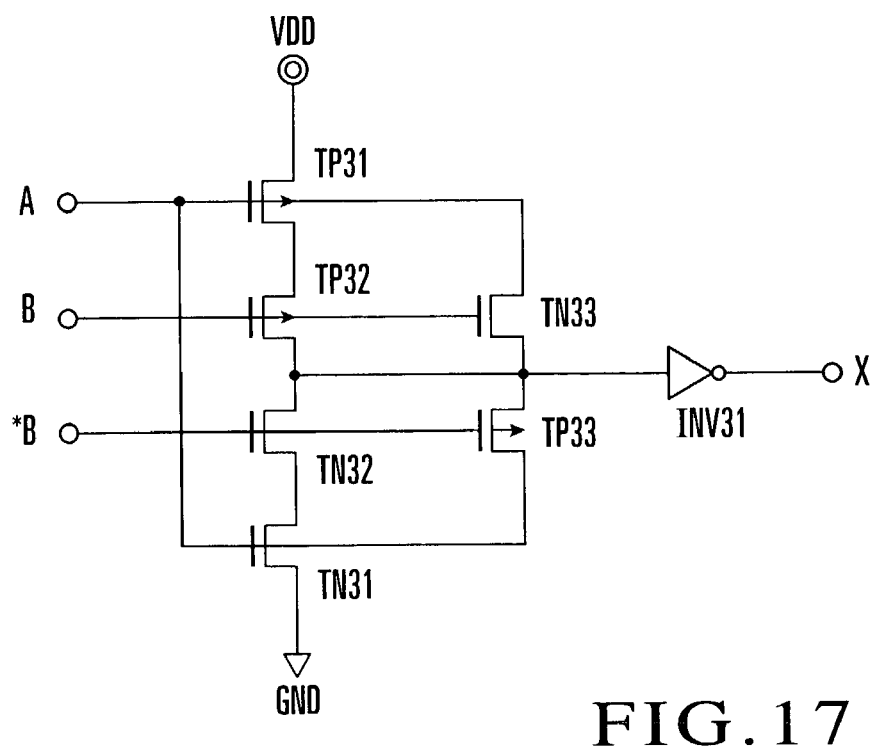
FIG. 17 is a circuit diagram showing another example of the logic circuit used in the present invention.

FIGS. 16 and 17 show detailed examples of the logic circuit (exclusive OR/exclusive NOR circuit). For the descriptive convenience, a transistor having the first conductivity type is defined as a PMOS transistor, and a transistor having the second conductivity type is defined as an NMOS transistor.

In the exclusive OR/exclusive NOR circuit shown in FIG. 16, the source of a PMOS transistor TP31 is connected to a high-potential power supply line VDD, and the drain of an NMOS transistor TN31 is connected to a low-potential power supply line GND.

The drain of the PMOS transistor TP31 is connected to the soured of a PMOS transistor TP32. The source of the NMOS transistor TN31 is connected to the drain of an NMOS transistor TN32. The gate of the NMOS transistor TN32 is connected to the gate of a PMOS transistor TP33. An input *B is supplied to the gate of the NMOS transistor TN32. The gate of the PMOS transistor TP32 is connected to the gate of an NMOS transistor TN33. An input *B obtained by inverting the input B is supplied to the gate of the PMOS transistor TP32.

The gate of the PMOS transistor TP31 is commonly connected to the gate of the NMOS transistor TN31, the source of the NMOS transistor TN33, and the drain of the PMOS transistor TP33. An input A is supplied to the gate of the PMOS transistor TP31.

The drain of the PMOS transistor TP32 is commonly connected to the source of the NMOS transistor TN32, the drain of the NMOS transistor TN33, and the source of the PMOS transistor TP33. An output X is extracted from the drain of the PMOS transistor TP32.

In the above arrangement, when the input B is "1" (high level), and the input *B is "0" (low level), the PMOS transistor TP32 and NMOS transistor TN32 are turned on, and the PMOS transistor TP33 an NMOS transistor TN33 are turned off. Hence, one of the NMOS transistor TN31 and PMOS transistor TP31 is turned on in accordance with the input A. The output X equals a signal obtained by inverting the input A.

In addition, when the input B is "0", and the input *B is "1", the PMOS transistor TP32 and NMOS transistor TN32 are turned off, and the PMOS transistor TP33 an NMOS transistor TN33 are turned on. For this reason, the output X equals the input A.

Hence, the output X is the exclusive OR of the inputs A and B and also exclusive NOR of the inputs A and *B.

As described above, according to the logic circuit shown in FIG. 16, since no input *A obtained by inverting the input A is necessary, unlike the conventional circuit, the number of input terminals can be small. In addition, since no new CMOS inverter needs to be added to generate the input *A when the input *A is not present, unlike the conventional circuit, the circuit scale can be reduced.

Furthermore, this circuit need not incorporate an inverter for inverting the input *A, which is necessary in the conventional circuit, six elements suffice to form the circuit. Hence, the number of circuit elements can be smaller than the conventional circuit, and the circuit scale can be reduced.

Also, when the input B is "0" (low level), both the PMOS transistor TP33 and the NMOS transistor TN33 are turned on, and the load capacitance of the output X becomes small. For this reason, power consumption can be reduced, and the operation speed can be increased.

FIG. 17 shows another example of the logic circuit (exclusive OR/exclusive NOR circuit). In this example, the input B and its inverted input *B in the logic circuit shown in FIG. 16 are replaced. The input terminal of an inverter INV31 is connected to the connection point between the drain of the PMOS transistor TP32, the source of the NMOS transistor TN32, the source of the PMOS transistor TP33, and the drain of the NMOS transistor TN33. The output X is extracted from the output terminal of the inverter INV31.

As described above, according to the logic circuit shown in FIG. 17, since no input *A obtained by inverting the input A is necessary, unlike the conventional circuit, the number of input terminals can be small. In addition, since no new CMOS inverter needs to be added when the input *A is not present, unlike the conventional circuit, the circuit scale can be reduced.

Furthermore, since the inverter INV31 is arranged on the output side, the output driving capability can be increased as compared to the logic circuit shown in FIG. 16.

What is claimed is:

1. A surface shape recognition sensor device comprising:
a number of sensor cells which are two-dimensionally arranged;
a decoder which selects a sensor cell;
an output circuit which sends a sensor output from said selected sensor cell;
a control circuit which sends an address signal to said decoder to select said sensor cell; and
a calibration mode signal line which is commonly connected to said sensor cells and simultaneously supplies a calibration mode signal from said control circuit to said sensor cells to designate calibration,
wherein each of said sensor cells comprises
a detection element which detects an electric amount that changes in accordance with a surface shape of an object to be detected,
a sensor circuit which performs sensing operation of measuring the electric amount detected by said detection element, converting the electric amount into a corresponding output signal, and outputting the output signal, and
a calibration circuit which adjusts a detection sensitivity of said sensor circuit on the basis of the sensor output obtained by the sensing operation of said sensor circuit, and
when the calibration mode signal is supplied from said control circuit to said sensor cells through said calibration mode signal line, on the basis of a selection signal from said decoder, calibration operation of adjusting the detection sensitivity of a corresponding sensor circuit is executed using said calibration circuit of said sensor cell, and
wherein the calibration operation is executed only when no surface shape detection operation is executed.

2. A device according to claim 1, wherein
said device further comprises a plurality of word lines commonly connected to, in said sensor cells, a plurality of sensor cells which are simultaneously selected, and
said decoder divisionally controls said word lines as blocks each including a predetermined number of word lines, and comprises a block selection circuit which outputs a block selection signal to select one of the blocks on the basis of an address signal to select one of said word lines, and a word line selection circuit which selects one word line on the basis of an AND between the block selection signal and the address signal, thereby selecting said cells to be calibrated.

3. A device according to claim 2, wherein said decoder comprises a batch selection address output circuit which outputs a batch selection address to simultaneously select all word lines instead of the address signal to select one of said word lines.

4. A device according to claim 1, wherein
said device further comprises a plurality of word lines commonly connected to, in said sensor cells, a plurality of sensor cells which are simultaneously selected, and
said decoder divisionally controls said word lines as blocks each including a predetermined number of word lines, and comprises a block selection circuit which outputs a block selection signal to select one of the blocks on the basis of an address signal to select one of said word lines, and a block multiplex selection circuit which simultaneously selects all word lines belonging to a block selected on the basis of an AND between the block selection signal and a multiplex selection control signal supplied in a calibration mode, thereby selecting said cells to be calibrated.

5. A device according to claim 4, wherein each of the blocks includes word lines whose number is equal to the number of times of sensing operation for detection sensitivity adjustment executed in each sensor cell in the calibration mode.

6. A device according to claim 4, wherein
each of the blocks includes word lines whose number is larger by one than the number of times of sensing operation for detection sensitivity adjustment executed in each sensor cell in the calibration mode, and
said block multiplex selection circuit simultaneously selects, in a the word lines belonging to the selected block, all word lines except one corresponding to the address signal on the basis of the AND between the block selection signal and the multiplex selection control signal supplied in the calibration mode, thereby selecting said cells to be calibrated.

7. A device according to claim 6, wherein said block multiplex selection circuit comprises a gate circuit which is arranged in correspondence with each word line and outputs an exclusive OR between the multiplex selection control signal and a word line selection signal which designates to select the word line on the basis of the address signal.

8. A device according to claim 7, wherein
said gate circuit comprises a first transistor having a first conductivity, a second transistor having a second conductivity, a third transistor having the first conductivity, a fourth transistor having the second conductivity, a fifth transistor having the first conductivity, and a sixth transistor having the second conductivity,
a first output terminal of said first transistor is connected to a high-potential power supply line,
a first output terminal of said second transistor is connected to a low-potential power supply line,
a second output terminal of said first transistor is connected to a first output terminal of said third transistor,
a second output terminal of said second transistor is connected to a first output terminal of said fourth transistor,
an input terminal of said first transistor is commonly connected to an input terminal of said second transistor, a first output terminal of said fifth transistor, and a first output terminal of said sixth transistor, to which a first input is supplied,
an input terminal of said fourth transistor is connected to an input terminal of said fifth transistor, to which a second input is supplied,
an input terminal of said third transistor is connected to an input terminal of said sixth transistor, to which a third input is supplied, and
a second output terminal of said third transistor is commonly connected to a second output terminal of said fourth transistor, a second output terminal of said fifth transistor, and a second output terminal of said sixth transistor, from which an output is extracted.

9. A device according to claim 8, wherein said device further comprises an inverter circuit,
in place of the third input, the second input is supplied to the input terminal of said third transistor and the input terminal of said sixth transistor,
in place of the second input, the third input is supplied to the input terminal of said fourth transistor and the input terminal of said fifth transistor, the second output terminal of said third transistor, the second output terminal of said fourth transistor, the second output terminal of said fifth transistor, and the second output terminal of said sixth transistor are connected, in place of the output, an input terminal of said inverter circuit, and the output is extracted from an output terminal of said inverter circuit.

10. A device according to claim 1, wherein said device further comprises a plurality of word lines commonly connected to, in said sensor cells, a plurality of sensor cells which are simultaneously selected, and said decoder comprises a batch multiplex selection circuit which simultaneously selects all word lines on the basis of a multiplex selection control signal supplied in a calibration mode, thereby selecting all sensor cells to be calibrated.

11. A device according to claim 10, wherein said batch multiplex selection circuit comprises a gate circuit which is arranged in correspondence with each word line and outputs an OR between the multiplex selection control signal and a word line selection signal which designates to select the word line on the basis of the address signal to select one of said word lines.

12. A device according to claim 11, wherein said decoder comprises a word line selection circuit which is arranged in correspondence with each word line and outputs, to said gate circuit ad the word line selection signal, an AND between the address signal to select one of said word lines and a nonselection control signal supplied to set all word lines in an unselected state.

* * * * *